(12) United States Patent
Craine

(10) Patent No.: US 8,732,820 B2
(45) Date of Patent: *May 20, 2014

(54) METHOD FOR INPUTTING USERNAMES AND PASSWORDS TO ACCESS OR USE DIFFERENT ASSETS

(76) Inventor: Dean A. Craine, Bellevue, WA (US)

( * ) Notice: Subject to any disclaimer, the term of this patent is extended or adjusted under 35 U.S.C. 154(b) by 291 days.

This patent is subject to a terminal disclaimer.

(21) Appl. No.: 13/447,722

(22) Filed: Apr. 16, 2012

(65) Prior Publication Data
US 2012/0204256 A1  Aug. 9, 2012

Related U.S. Application Data

(63) Continuation of application No. 12/362,265, filed on Jan. 29, 2009, now Pat. No. 8,161,545.

(60) Provisional application No. 61/062,946, filed on Jan. 29, 2008.

(51) Int. Cl.
*G06F 21/00* (2013.01)

(52) U.S. Cl.
USPC ............. 726/18; 726/16; 726/17; 726/19; 726/20; 713/182; 713/183; 713/184; 713/185; 713/186

(58) Field of Classification Search
USPC .......................................... 726/18
See application file for complete search history.

(56) References Cited

U.S. PATENT DOCUMENTS

2008/0307236 A1* 12/2008 Lu et al. ............. 713/184

* cited by examiner

*Primary Examiner* — Longbit Chai
(74) *Attorney, Agent, or Firm* — Dean A. Craine

(57) ABSTRACT

A method for imputing different usernames and passwords using an input device with a display to use different protected assets that requires the inputting of a preselected username into a username enter box and the inputting of a preselected password into a password entry box immediately prior to use. The method includes the steps of designating two or more username keys on said input device, each said username key being assigned with a unique letter or number located on said input device and to a unique username made of a plurality of alpha-number characters, designating two or more password keys on the input device each being assigned with a letter or number located on said input device and to a unique password made of a plurality of alpha-number characters. Next the protected asset is then accessed and the username key and keyword key assigned to the asset is imputed.

5 Claims, 4 Drawing Sheets

Figure 1:
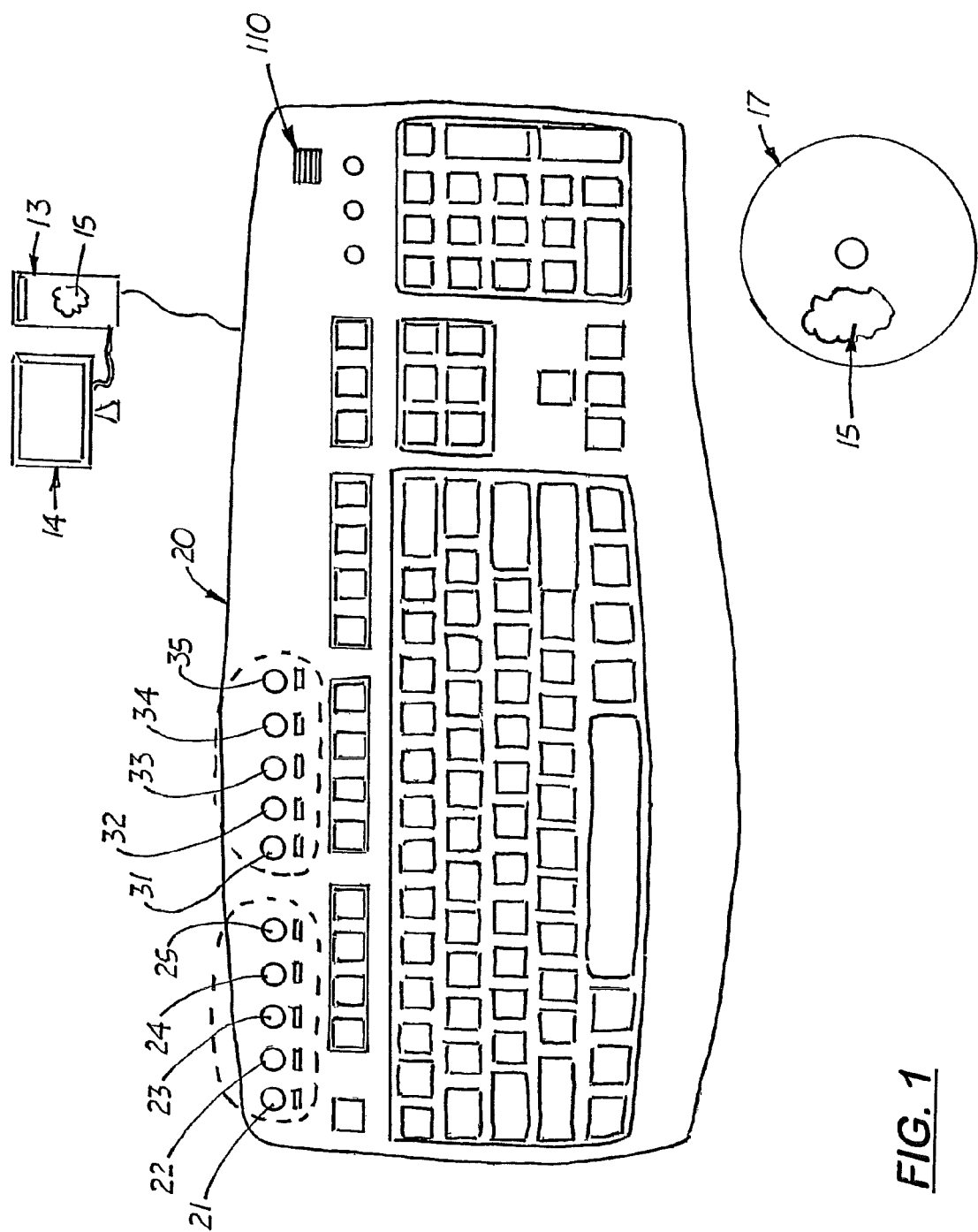

| ACCOUNT | USER NAME | PASSWORD | LAST CHANGED |
|---|---|---|---|
| ABC Bank Website | 1 | 1 | 1/1/2007 |
| DEF Bank Website | 1 | 2 | 5/1/2006 |
| Health Care Provider Website | 2 | 2 | 9/1/2005 |
| Music Website | 3 | 1 | 12/2/2004 |
| Book Store Website | 4 | 3 | 4/30/2005 |
| Email Account #1 | 2 | 4 | 3/31/2004 |
| Email Account #2 | 5 | 5 | 2/28/2006 |
| Network #1 | 4 | 3 | 9/30/2007 |
| Network #2 | 2 | 4 | 3/14/2006 |
| This Computer | 3 | 5 | 6/10/2006 |

FIG. 4

METHOD FOR INPUTTING USERNAMES AND PASSWORDS TO ACCESS OR USE DIFFERENT ASSETS

This is a utility patent application which claims benefit of U.S. Provisional Application No. 61/062,946, filed on Jan. 29, 2008 and a continuation application of pending U.S. patent application Ser. No. 12/362,265, filed on Jan. 29, 2009.

BACKGROUND OF THE INVENTION

1. Field of the Invention:

This invention pertains to computer security measures for logging onto a computer or website using pre-assigned usernames and passwords.

2. Description of the Related Art:

Usernames and passwords are commonly used for logging onto various computers, networks and websites. Keeping track of the usernames and passwords and changing them on a regular basis and then recalling the new usernames and passwords are very difficult for most computer users. Because usernames and passwords are so commonly used, correctly typing them each time to use a computer, to open a program, to open a file, to connect to a network or to visit a website is very time consuming and annoying.

Because most individuals use their memories to recall usernames and passwords, the usernames and password chosen are usually relatively simple and easy to memorize. However, many websites are mandating users choose more complex passwords for security purposes. Complex passwords may include use of a capital letter, a required amount of letters/numbers, distinct characters, etc. These complex passwords can be difficult to recall.

What is needed is a system that allows the user to easily recall both simple and more complex usernames and passwords and automatically and accurately type them into the computer when needed.

SUMMARY OF THE INVENTION

These objects are met by the system disclosed herein that includes a computer input device, such as a keyboard, that has a plurality of programmable username keys and a plurality of password keys that can be selectively assigned to different usernames and different passwords, respectively. When a user is required to input a username and password to use a computer, to use a network, to open a software program or to visit a website, the user simply moves the cursor on the display to the proper username and password entry box and touches the proper username or and password key, respectively. The username and password assigned to the username keys and password keys are automatically inputted into the username and password entry boxes, respectively.

The system includes a username and password recording software program that presents a username and password recording page where a plurality of different usernames and passwords and entered. Each username is assigned to a username key and each password is assigned to a password key on the keyboard by the software program. The software program also presents a protected asset menu page in which the names of specific protected assets used or accessed by the user are listed. Protected assets may be any hardware, network, software program, file or website or website account that requires the input of a username and a password. The user then assigns to each protected asset the username key and password key associated with the username and password needed to open or access the protected asset. The protected asset menu page may include a date column that informs the user when the username and password for each protected asset was last changed.

In one embodiment, the username keys are grouped together on one side of the keyboard and the password keys are grouped together on the opposite side of the keyboard. Located adjacent to each key is an optional label with asset identifying indicia printed thereon that reminds the user that a particular protected asset has been assigned to the adjacent username key or password key.

Because the protected asset may be listed adjacent to the username key and password key, a means for activating or deactivating the username keys and password keys is also provided.

DESCRIPTION OF THE DRAWINGS

FIG. 1 is a top plan view of a computer keyboard with a plurality of username keys and a plurality of password keys that can be selectively programmed by the user.

FIG. 2 is a top plan view of the computer keyboard shown in FIG. 1 with a plurality of username keys and the plurality of password keys more clearly shown.

FIG. 3 is an illustration of a table created by the system on the display that is shown to the user that allows the user to assign different usernames and passwords to the username keys and password keys, respectively.

FIG. 4 is an illustration of a table created by the system on the display that is shown to the user that allows the user to create different account entities and assign different combinations of username keys and password keys to each account entity, and records the date the username and passwords were last changed.

DESCRIPTION OF THE PREFERRED EMBODIMENT

Referring to FIGS. 1-4, there is shown a system 10 that allows a user to create and record different usernames 45 and passwords 55 for using the computer denoted 13 to open or access various networks, various software programs, files, and websites.

The system 10 includes a computer input device, represented as a keyboard 20 that has a plurality of programmable username keys 21-25 and a plurality of password keys 31-35. A software program 15 is used to assign different usernames 45 and passwords 55 to the username keys 21-25 and the password keys 31-35, respectively.

During setup, the software program 15 is loaded into the computer 13 linked to the keyboard 20. The software program 15 presents on the computer's display 14 a User Name and Password Recording page 40, as shown in FIG. 3. The Recording Page 40 presents the assigned Letters or Numbers 1-5 of the programmable username keys 21-25 and the assigned Letters or Numbers 1-5 of the programmable password keys 31-35, respectively. On the Recording Page 40, blank entry lines are provided in which specific usernames 45 and passwords 55 to be entered. When finished, the SAVE button 60 is pressed which automatically assigns the inputted username 45 and password 55 to the username key 21-25 number and password key 31-35 number. On the Recording Page 40, an Edit button 65 and Cancel button 70 are provided that allows the user to edit or change the username 45 and password 55 assigned to different username keys 21-25 and password keys 31-35, respectively.

When the user is required to enter a username 45 or password 55 to use the computer 13, to use a password protected program, to access a network, to open a software program, or to access a website, the user moves the cursor on the display to the username or password input field and touches one of the pre-programmed username keys 21-25 and password keys 31-35, respectively, on the keyboard 20 which automatically inputs the username 45 and password 55 associated with the keys 21-25 and 31-35, as recording in the Recording Page 40.

The software program 15 is also designed to create a protected asset menu table 80 shown in FIG. 4 includes an Account column 85 that allows the user to create a list of different protected assets and then assign the username key 21-25 and password key 31-35 recited in the Recording Page 40. On the menu table 80, a Last Changed date column 100 is provided that informs the user when the username keys 21-25 and password keys 31-35 associated with the username 45 and passwords 55 were changed for the asset entity. The new table may be stored into the computer hard drive so that the user may easily select or change the username 45 or password 55 at any time, or it may be stored only on the portable storage device.

Figure 2:
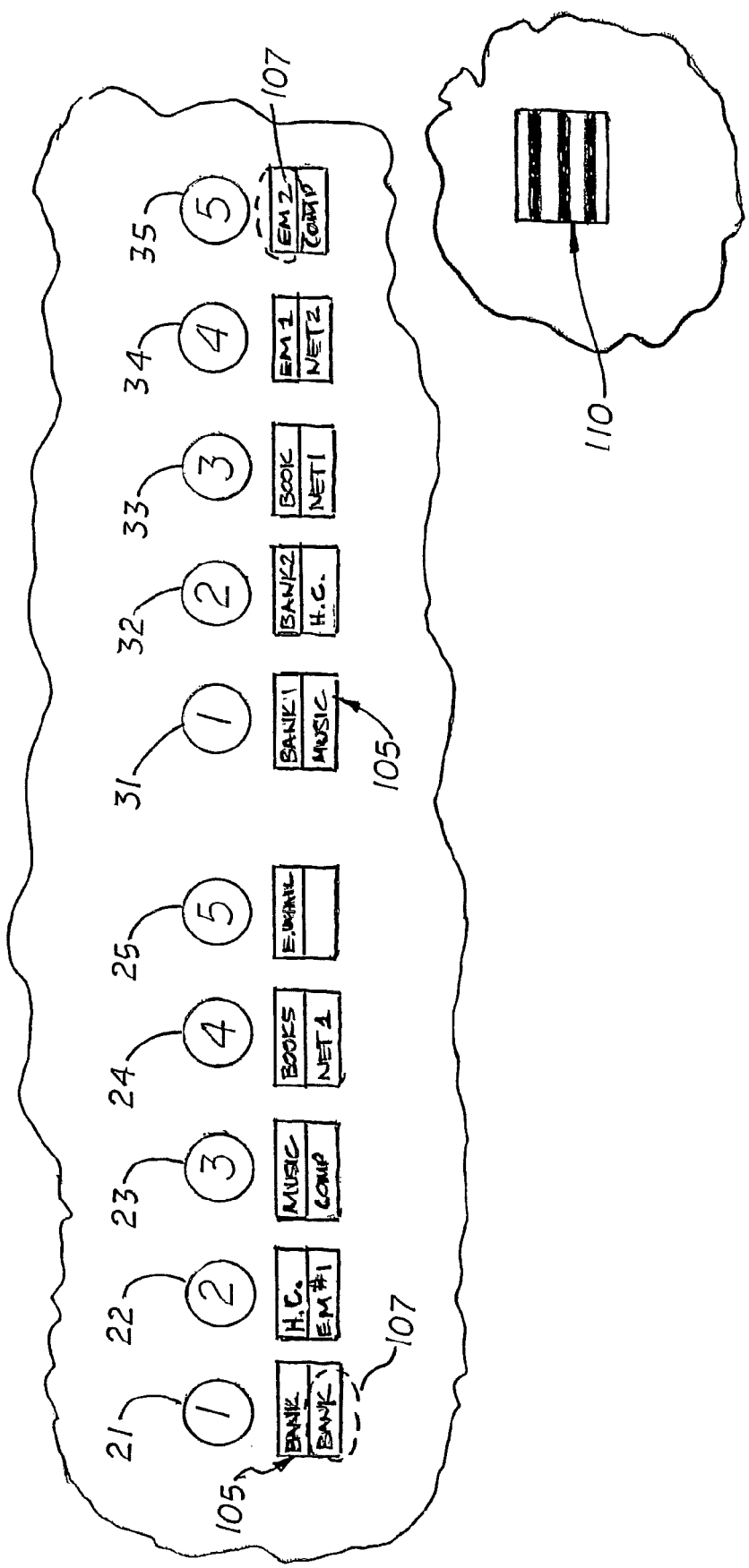
Figure 3:
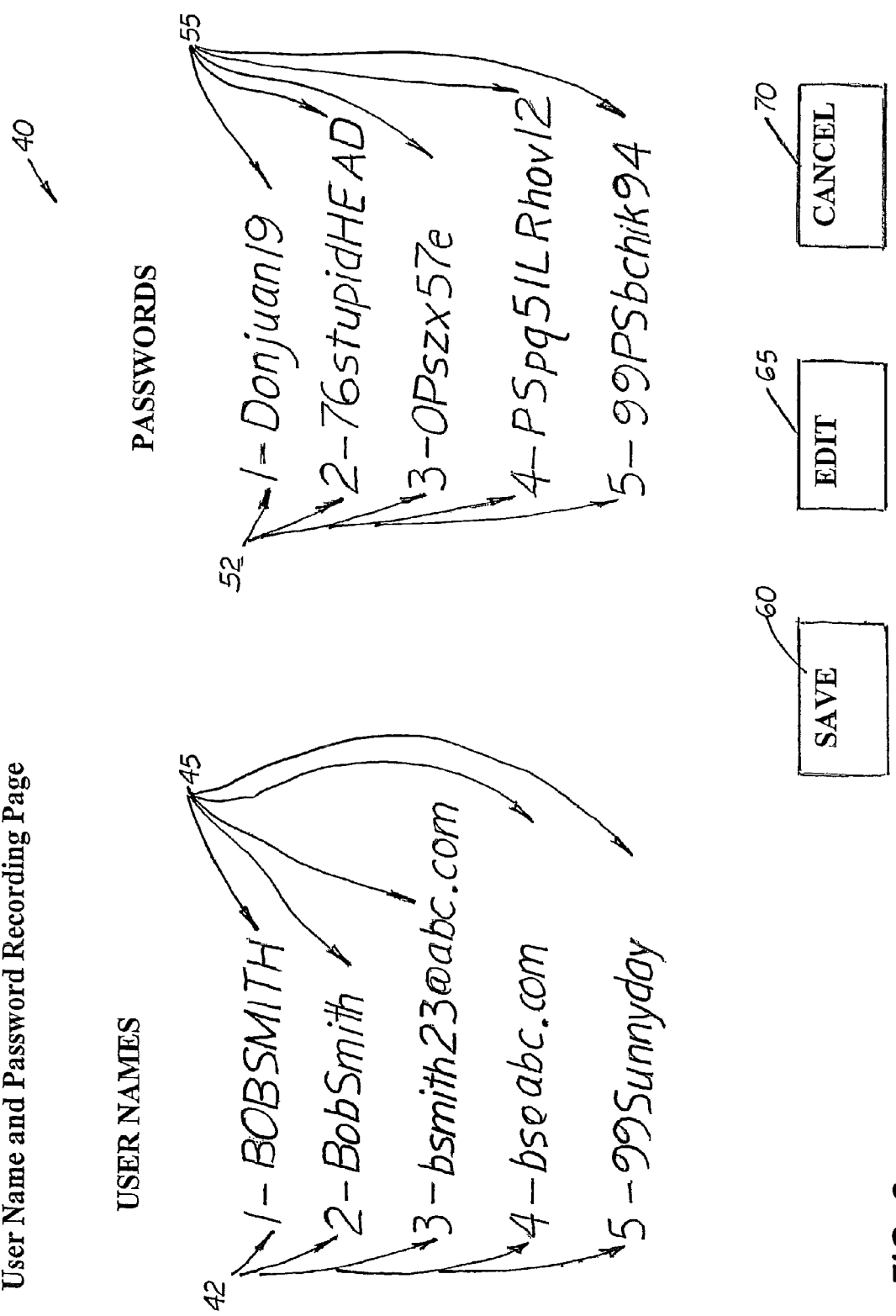

As shown in FIG. 2, located below the keys 21-25 and 31-35 are labels 105 with indicia 107 printed on them that corresponds to the information in the menu table 80 shown in FIG. 4. Preferably, the keyboard 20 includes an authorization feature, such as a finger print reader 110, a key fob, or a Blue Tooth linked device, that is used as a security device which determines if the user is an authorized user of the keyboard 20. If the keyboard user is not an authorized user, then the username keys 21-25 and the password keys 31-35 may inactivate. Also, access to the Recording Page 40 and Menu table 80 is blocked.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A method for inputting different usernames and passwords using an input device with a display to use different protected assets that requires the inputting of a preselected username into a username entry box and the inputting of a preselected password into a password entry box immediately prior to use, said method comprises the following steps:
    a. designating a first group of two or more username keys that can be selected by at least touching from an user on said input device, said each said username key being assigned with a unique letter or number, as an identifying indicia, located on said input device and to a unique username made of a plurality of alpha-number characters;
    b. designating a second group of two or more password keys that can be selected by at least touching from said user on said input device, said each said password key being assigned with a unique letter or number, as an identifying indicia located on said input device and to a unique password made of a plurality of alpha-number characters;
    c. accessing said protecting asset and presenting said username entry box and said password entry box on said display of the input device;
    d. inputting said username key on said input device associated with said username assigned to said protected asset to automatically input said unique username into the username entry box; and,
    e. inputting said password key on said input device associated with said password assigned to said protected asset to automatically input said unique password into the password entry box; and
    f. authorizing the user to access said protected asset after successful validation of said preselected username and password.

2. The method as recited in claim 1, wherein said protected assets includes one of the following group or protected assets: a computer, a password protected software program, a network, and a website.

3. The method as recited in claim 1, wherein said input device includes an authorization feature that enables said input device to be used.

4. The method as recited in claim 1, wherein each said username key is assigned a single alpha-numeric symbol.

5. The method as recited in claim 1, wherein each said keyword key is assigned a single alpha-numeric symbol.

* * * * *